(12) United States Patent
Yamada et al.

(10) Patent No.: US 10,024,428 B2
(45) Date of Patent: Jul. 17, 2018

(54) HYDRAULIC CONTROL DEVICE, CONTROL METHOD OF THEREOF, AND AUTOMATIC TRANSMISSION

(75) Inventors: Naohiro Yamada, Atsugi (JP); Keichi Tatewaki, Atsugi (JP); Shinichiro Watanabe, Yokohama (JP); Noritaka Aoyama, Atsugi (JP)

(73) Assignees: JATCO LTD, Fuji-Shi (JP); NISSAN MOTOR CO., LTD., Yokohama-Shi (JP)

( * ) Notice: Subject to any disclaimer, the term of this patent is extended or adjusted under 35 U.S.C. 154(b) by 1888 days.

(21) Appl. No.: 13/218,039

(22) Filed: Aug. 25, 2011

(65) Prior Publication Data
US 2012/0060485 A1 Mar. 15, 2012

(30) Foreign Application Priority Data
Sep. 10, 2010 (JP) ................. 2010-203468

(51) Int. Cl.
| | |
|---|---|
| F16D 13/20 | (2006.01) |
| F16H 61/662 | (2006.01) |
| F16H 61/00 | (2006.01) |
| F16H 37/02 | (2006.01) |
| F16H 61/70 | (2006.01) |

(52) U.S. Cl.
CPC ... *F16H 61/66272* (2013.01); *F16H 61/0025* (2013.01); *F16H 37/022* (2013.01); *F16H 61/70* (2013.01); *F16H 2037/023* (2013.01); *F16H 2312/14* (2013.01)

(58) Field of Classification Search
CPC .......... F16H 61/0025; F16H 61/66272; F16H 61/70; F16H 37/022; F16H 2037/023; F16H 2061/0034; F16H 2312/14
USPC ......... 60/400, 403, 413, 428, 430, 431, 466, 60/468, 469, 441, 435, 438
See application file for complete search history.

(56) References Cited

U.S. PATENT DOCUMENTS

| | | | | |
|---|---|---|---|---|
| 4,355,959 | A * | 10/1982 | Kono et al. | 417/223 |
| 7,225,616 | B2 * | 6/2007 | Shimakura | 60/432 |
| 8,108,115 | B2 * | 1/2012 | Kobayashi et al. | 701/67 |
| 2008/0308355 | A1 * | 12/2008 | Kakinami et al. | 184/27.2 |
| 2010/0184562 | A1 | 7/2010 | Senda et al. | |

FOREIGN PATENT DOCUMENTS

| | | |
|---|---|---|
| JP | 01-135956 A | 5/1989 |
| JP | 07-167261 A | 7/1995 |
| JP | 2001-289315 A | 10/2001 |
| JP | 2002-227978 A | 8/2002 |
| JP | 2002-357266 A | 12/2002 |
| JP | 2006-504915 A | 2/2006 |
| JP | 2006-170295 A | 6/2006 |

(Continued)

*Primary Examiner* — Logan Kraft
(74) *Attorney, Agent, or Firm* — Foley & Lardner LLP

(57) ABSTRACT

A hydraulic control device includes an oil pump for generating a hydraulic pressure by being rotated by power of a driving force source, a driving force source stopping unit that stops rotation of the driving force source when a predetermined condition holds, and a cut-off unit that cuts off transmission of the power from the driving force source to the oil pump when the driving force source rotates in a reverse direction as the rotation of the driving force source is stopped by the driving force source stopping unit.

13 Claims, 9 Drawing Sheets

(56) References Cited

FOREIGN PATENT DOCUMENTS

| JP | 2008-128096 A | 6/2008 |
|----|---------------|--------|
| JP | 2008-185022 A | 8/2008 |
| JP | 2010-164143 A | 7/2010 |
| WO | WO 2012/025080 A1 | 3/2012 |

* cited by examiner

HYDRAULIC CONTROL DEVICE, CONTROL METHOD OF THEREOF, AND AUTOMATIC TRANSMISSION

FIELD OF THE INVENTION

The present invention provides a hydraulic control device, a control method and an automatic transmission which suppress a reduction of a hydraulic pressure of a transmission in a vehicle capable of stopping a driving force source while running.

BACKGROUND OF THE INVENTION

An idle stop control is known which stops an engine as a driving force source while a vehicle is in a stopped state. A control to stop an engine when a predetermined condition holds also while a vehicle is running is disclosed in JP2010-164143A. Fuel economy of the engine can be improved by such a control.

SUMMARY OF THE INVENTION

A shift of a transmission is controlled using a hydraulic pressure (line pressure) generated by an oil pump driven by an engine as a source pressure. For example, in a stepped transmission mechanism, rotation is transmitted by controlling engaged and released states of frictional engagement elements by a hydraulic pressure. Further, in a continuously variable transmission mechanism, a shift is made by transmitting rotation while clamping a belt mounted on pulleys by a hydraulic pressure.

In such a transmission, the oil pump driven by the engine stops when the engine stops while the vehicle is running. Thus, the supply of the hydraulic pressure to the frictional engagement elements and the pulleys is stopped. However, the hydraulic pressure does not immediately decrease in an oil path for supplying the hydraulic pressure from the oil pump to the frictional engagement elements and the pulleys and an engaging force of the frictional engagement element and a belt clamping force can be ensured for a predetermined time after the start of the stopped state of the engine. Thus, the engine can be stopped for the predetermined time before vehicle speed becomes zero.

However, when the engine stops, it may temporarily rotate in a reverse direction due to a compression reaction force of a cylinder. Since this causes the oil pump to rotate in a reverse direction, the hydraulic pressure in the oil path is sucked into the oil pump and the hydraulic pressure in the oil path suddenly decreases.

Since the engaging force and the clamping force of the frictional engagement element and the belt of the transmission suddenly decrease due to a sudden decrease of the hydraulic pressure in the oil path, the predetermined time during which the engaging force of the frictional engagement element and the belt clamping force are ensured from the start of the stopped state of the engine becomes very short. Thus, a time during which the engine can be stopped is shortened, thereby causing a problem of being unable to improve fuel economy.

The present invention was developed in view of such a problem and aims to provide a hydraulic control device which suppresses a reduction of a hydraulic pressure when a driving force source stops.

A hydraulic control device according to an aspect of this invention includes an oil pump for generating a hydraulic pressure by being rotated by power of a driving force source; a driving force source stopping unit that stops rotation of the driving force source when a predetermined condition holds; and a cut-off unit that cuts off transmission of the power from the driving force source to the oil pump when the driving force source rotates in a reverse direction as the rotation of the driving force source is stopped by the driving force source stopping unit.

A control method according to another aspect of this invention is used to control a hydraulic control device which includes an oil pump for generating a hydraulic pressure by being rotated by power of a driving force source, and a driving force source stopping unit that stops rotation of the driving force source when a predetermined condition holds. The control method includes cutting off transmission of the power from the driving force source to the oil pump when the driving force source rotates in a reverse direction as the rotation of the driving force source is stopped by the driving force source stopping unit.

According to these aspects, even if the driving force source rotates in the reverse direction when the rotation of the driving force source stops, a reduction of the hydraulic pressure caused by reverse rotation of the oil pump is suppressed by making it impossible to transmit the reverse rotation of the driving force source to the oil pump. Thus, it is possible to suppress the shortening of a time during which the driving force source can be stopped and improve fuel economy.

DESCRIPTION OF THE PREFERRED EMBODIMENTS

Hereinafter, embodiments of the present invention are described with reference to the accompanying drawings. In the following description, a "speed ratio" of a certain transmission is a value obtained by dividing an input rotation speed of this transmission by an output rotation speed thereof. A "lowest speed ratio" means a maximum speed ratio of this transmission and a "highest speed ratio" means a minimum speed ratio thereof.

First Embodiment

Figure 1:
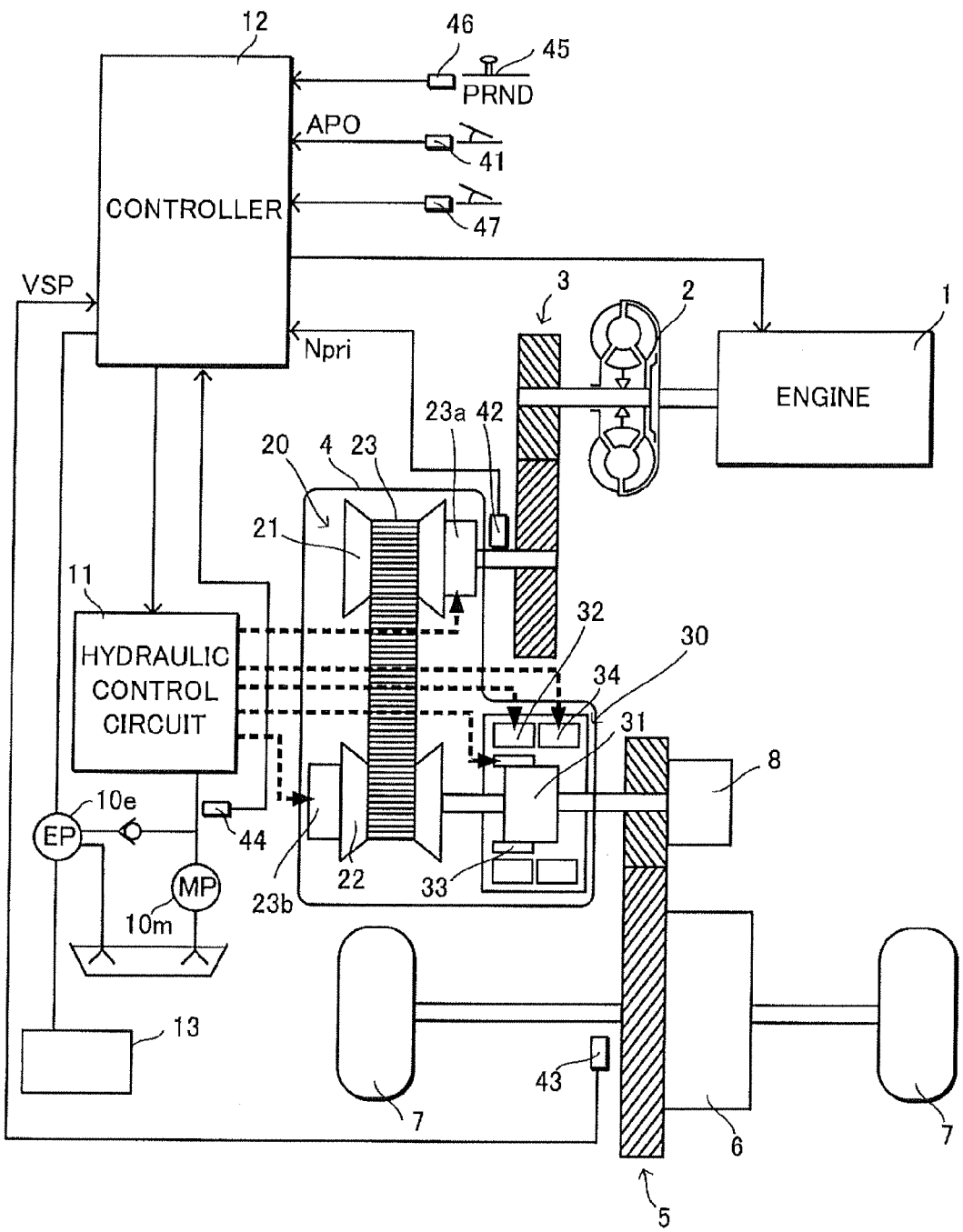
FIG. 1 is a schematic construction diagram of a vehicle including a continuously variable transmission according to a first embodiment.

FIG. 1 is a schematic construction diagram of a vehicle including a continuously variable transmission according to a first embodiment of the present invention. This vehicle includes an engine 1 as a power source. Output rotation of the engine 1 is transmitted to drive wheels 7 via a torque converter 2 with a lock-up clutch, a first gear train 3, a continuously variable transmission (hereinafter, merely referred to as a "transmission 4"), a second gear train 5 and a final speed reducer 6. The second gear train 5 includes a parking mechanism 8 for mechanically locking an output shaft of the transmission 4 in a parked state so as not to be able to rotate.

The vehicle includes a mechanical oil pump 10*m* to which the rotation of the engine 1 is input and which is driven by utilizing a part of power of the engine 1 and an electrical oil pump 10*e* which is driven upon receiving the supply of power from a battery 13. The transmission 4 includes a hydraulic control circuit 11 for adjusting a hydraulic pressure (hereinafter, referred to as a "line pressure") supplied from at least either one of the mechanical oil pump 10*m* or the electrical oil pump 10*e* and supplying the adjusted hydraulic pressure to the respective components of the transmission 4, and a controller 12 for controlling the hydraulic control circuit 11.

The transmission 4 includes a continuously variable transmission mechanism (hereinafter, referred to as a "variator 20") and a sub-transmission mechanism 30 provided in series with the variator 20. "To be provided in series" means that the variator 20 and the sub-transmission mechanism 30 are provided in series in a power transmission path. The sub-transmission mechanism 30 may be directly connected to an output shaft of the variator 20 as in this example or may be connected via another transmission or power transmission mechanism (e.g. gear train).

The variator 20 is a belt-type continuously variable transmission including a primary pulley 21, a secondary pulley 22 and a V-belt 23 mounted between the pulleys 21 and 22. Each of the pulleys 21, 22 includes a fixed conical plate, a movable conical plate arranged with a sheave surface faced toward the fixed conical plate and forming a V-groove between the fixed conical plate and the movable conical plate, and a hydraulic cylinder 23*a*, 23*b* provided on the back surface of the movable conical plate for displacing the movable conical plate in an axial direction. When hydraulic pressures supplied to the hydraulic cylinders 23*a*, 23*b* are adjusted, the width of the V-groove changes to change contact radii of the V-belt 23 and the respective pulleys 21, 22, whereby a speed ratio vRatio of the variator 20 continuously changes.

The sub-transmission mechanism 30 is a transmission mechanism with two forward speeds and one reverse speed. The sub-transmission mechanism 30 includes a Ravigneaux-type planetary gear mechanism 31 in which carriers of two planetary gears are coupled, and a plurality of frictional engagement elements (low brake 32, high clutch 33, reverse brake 34) which are connected to a plurality of rotation elements constituting the Ravigneaux-type planetary gear mechanism 31 to change coupled states of these rotation elements. If the supply of hydraulic pressures to the respective frictional engagement elements 32 to 34 are adjusted to change engaged and released states of the respective frictional engagement elements 32 to 34, a gear position of the sub-transmission mechanism 30 is changed.

For example, the sub-transmission mechanism 30 is set to a first gear position if the low brake 32 is engaged and the high clutch 33 and the reverse brake 34 are released. The transmission mechanism 30 is set to a second gear position with a gear ratio smaller than in the first gear position if the high clutch 33 is engaged and the low brake 32 and the reverse brake 34 are released. The sub-transmission mechanism 30 is set to a reverse gear position if the reverse brake 34 is engaged and the low brake 32 and the high brake 33 are released. In the following description, a case where the sub-transmission mechanism 30 is in the first gear position is expressed by that "the transmission 4 is in a low-speed mode" and a case where the sub-transmission mechanism 30 is in the second gear position is expressed by that "the transmission 4 is in a high-speed mode".

Figure 2:
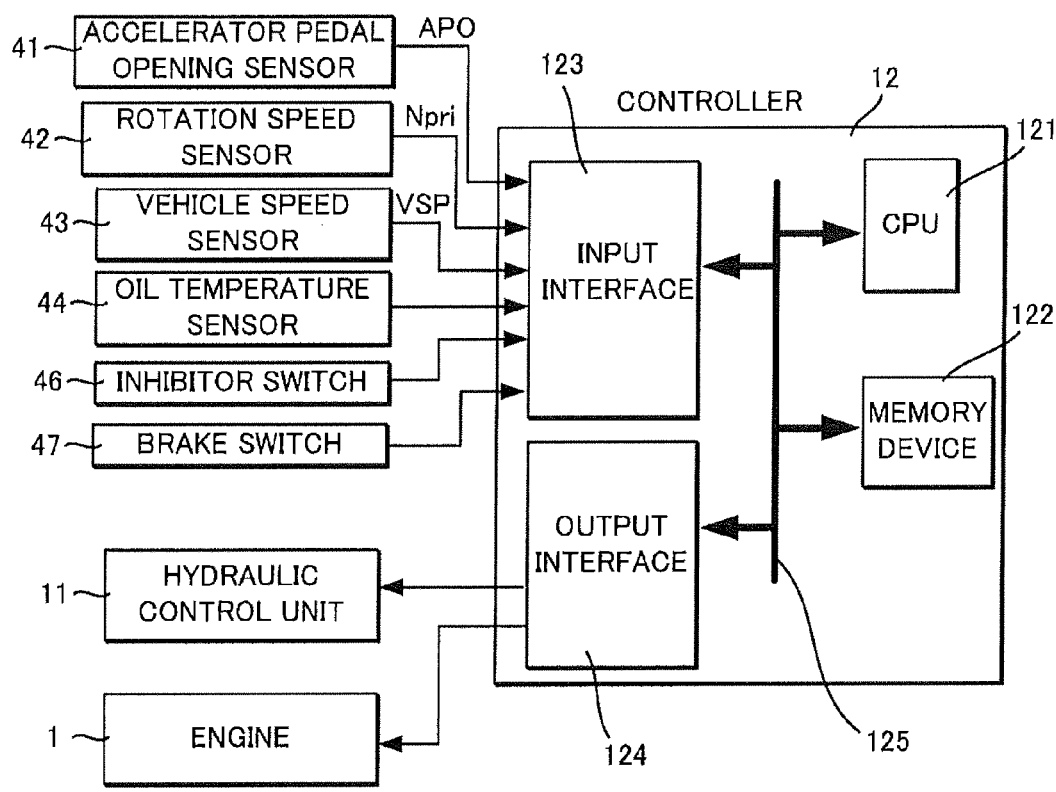
FIG. 2 is a diagram showing an exemplary construction of a transmission controller according to the first embodiment.

The controller 12 is a control unit for controlling the engine 1 and the transmission 4 in a comprehensive manner and includes a CPU 121, a memory device 122 composed of a RAM/ROM, an input interface 123, an output interface 124 and a bus 125 which connects these components to each other as shown in FIG. 2.

To the input interface 123 are input an output signal of an accelerator pedal opening sensor 41 for detecting the opening of an accelerator pedal (hereinafter, referred to as an "accelerator pedal opening APO"), an output signal of a rotation speed sensor 42 for detecting an input rotation speed of the transmission 4 (=rotation speed of the primary pulley 21, hereinafter, referred to as a "primary rotation speed Npri"), an output signal of a vehicle speed sensor 43 for detecting a driving speed of the vehicle (hereinafter, referred to as a "vehicle speed VSP"), an output signal of an oil temperature sensor 44 for detecting the oil temperature of the transmission 4, an output signal of an inhibitor switch 46 for detecting the position of a select lever 45, an output signal of a brake switch 47 for detecting depression of a brake pedal, and like output signals.

A control program of the engine 1, a transmission control program of the transmission 4, and a shift map (FIG. 3) used in this transmission control program are stored in the memory device 122. The CPU 121 reads the transmission control program stored in the memory device 122 and implements it, performs various computations on various signals input via the input interface 123 to generate a fuel injection signal, an ignition timing signal, a throttle opening signal and a transmission control signal, and outputs the generated transmission control signal to the hydraulic control circuit 11 via the output interface 124. Various values used in the computations by the CPU 121 and computation results are appropriately stored in the memory device 122.

The hydraulic control circuit 11 includes a plurality of flow passages and a plurality of hydraulic control valves. In accordance with the transmission control signal from the controller 12, the hydraulic control circuit 11 controls the plurality of hydraulic control valves to switch supply paths of the hydraulic pressure, prepares a necessary hydraulic pressure from a hydraulic pressure produced by the oil pump 10*m*, and supplies this hydraulic pressure to the respective components of the transmission 4. In this way, the speed ratio vRatio of the variator 20 and the gear position of the sub-transmission mechanism 30 are changed to shift the transmission 4.

Figure 3:
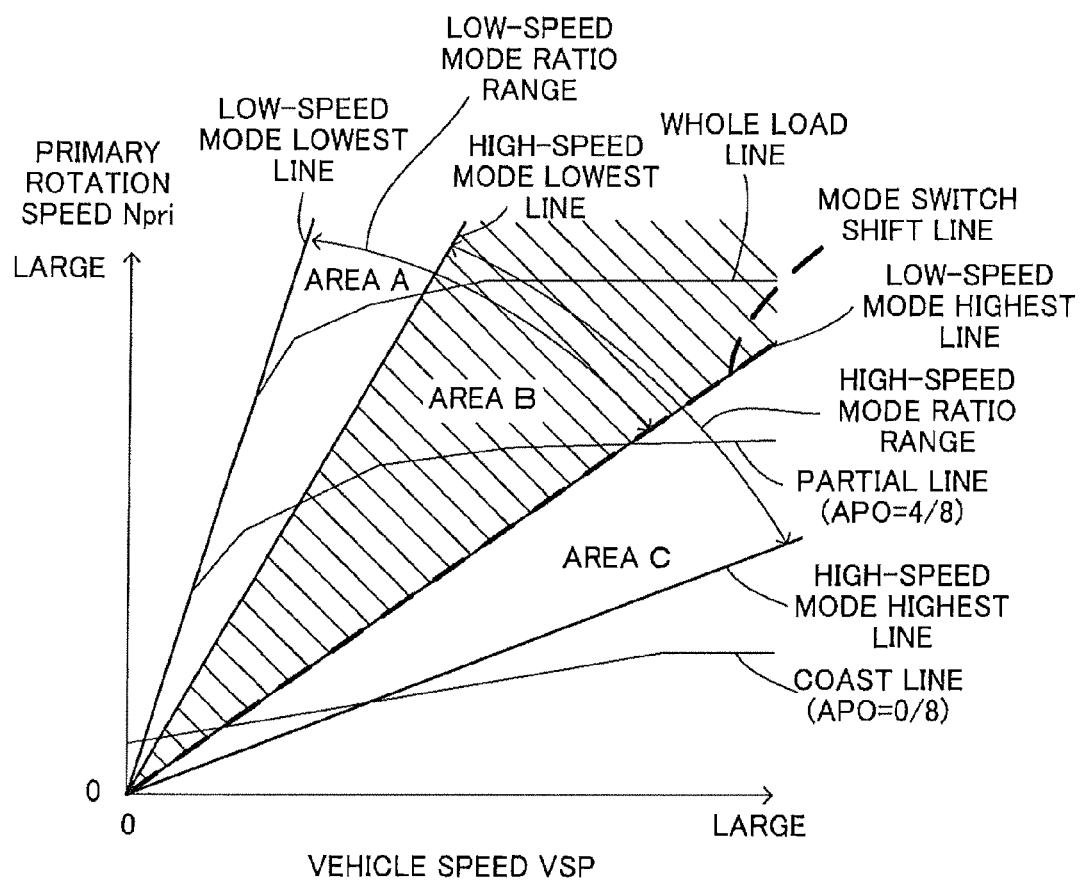
FIG. 3 is a graph showing an example of a shift map according to the first embodiment.

FIG. 3 shows an example of the shift map stored in the memory device 122 of the controller 12 of this embodiment. On this shift map, an operating point of the transmission 4 is determined based on the vehicle speed VSP and the primary rotation speed Npri. The inclination of a line connecting the operating point of the transmission 4 and a zero point at the lower left corner of the shift map indicates the speed ratio of the transmission 4 (overall speed ratio obtained by multiplying the speed ratio vRatio of the variator 20 by a speed ratio subRatio of the sub-transmission mechanism 30, hereinafter, referred to as a "through speed ratio Ratio"). In this shift map, a shift line is set for each accelerator pedal opening APO similar to a shift map of a conventional v-belt continuously variable transmission, and the transmission 4 is shifted in accordance with the shift line selected based on the accelerator pedal opening APO. For simplicity, only a whole load line (shift line when the accelerator pedal opening APO=8/8), a partial load line (shift line when the accelerator pedal opening APO=4/8) and a coast line (shift line when the accelerator pedal opening APO=0/8) are shown in FIG. 3.

When being in the low-speed mode, the transmission 4 can be shifted between a low-speed mode lowest line obtained by maximizing the speed ratio vRatio of the variator 20 and a low-speed mode highest line obtained by minimizing the speed ratio vRatio of the variator 20. At this time, the operating point of the transmission 4 moves in areas A and B. On the other hand, when being in the high-speed mode, the transmission 4 can be shifted between a high-speed mode lowest line obtained by maximizing the speed ratio vRatio of the variator 20 and a high-speed mode highest line obtained by minimizing the speed ratio vRatio of the variator 20. At this time, the operating point of the transmission 4 moves in areas B and C.

The speed ratio of each gear position of the sub-transmission mechanism 30 is so set that the speed ratio corresponding to the low-speed mode highest line (low-speed mode highest speed ratio) is smaller than the speed ratio corresponding to the high-speed mode lowest line (high-speed mode lowest speed ratio). By this, a low-speed ratio range which is a range of the through speed ratio Ratio of the transmission 4 that can be set in the low-speed mode and a high-speed mode ratio range which is a range of the through speed ratio Ratio of the transmission 4 that can be set in the high-speed mode partly overlap, and the transmission 4 can be selectively set in either one of the low-speed mode or the high-speed mode if the operating point of the transmission 4 is in the area B defined between the high-speed mode lowest line and the low-speed mode highest line.

The controller 12 sets the through speed ratio Ratio corresponding to the vehicle speed VSP and the accelerator pedal opening APO (driving condition of the vehicle) as a final through speed ratio DRatio by referring to this shift map. This final through speed ratio DRatio is a target value which should be finally reached by the through speed ratio Ratio in this driving condition. Then, the controller 12 sets a target through speed ratio tRatio which is a transient target value for causing the through speed ratio Ratio to follow the final through speed ratio DRatio with desired response characteristics, and controls the variator 20 and the sub-transmission mechanism 30 so that the through speed ratio Ratio coincides with the target through speed ratio tRatio.

On this shift map, a mode switch shift line at which the sub-transmission mechanism 30 is shifted (1-2 shift line of the sub-transmission mechanism 30) is so set as to overlap the low-speed mode highest line. A through speed ratio corresponding to the mode switch shift line (hereinafter, referred to as a "mode switch speed ratio mRatio") is equal to the low-speed mode highest speed ratio.

When the operating point of the transmission 4 crosses the mode switch shift line, i.e. the through speed ratio Ratio of the transmission 4 changes over the mode switch speed ratio mRatio, the controller 12 executes a mode switch shift control. In this mode switch shift control, the controller 12 shifts the sub-transmission mechanism 30 and performs a synchronization shift to change the speed ratio vRatio of the variator 20 in a direction opposite to a changing direction of the speed ratio subRatio of the sub-transmission mechanism 30.

In the synchronization shift, when the through speed ratio Ratio of the transmission 4 changes from a value larger than the mode switch speed ratio mRatio to a value smaller than that, the controller 12 shifts up the gear position of the sub-transmission mechanism 30 from the first gear position to the second gear position (hereinafter, referred to as "1-2 shift") and increases the speed ratio vRatio of the variator 20. Conversely, when the through speed ratio Ratio of the transmission 4 changes from a value smaller than the mode switch speed ratio mRatio to a value larger than that, the controller 12 shifts down the gear position of the sub-transmission mechanism 30 from the second gear position to the first gear position (hereinafter, referred to as "2-1 shift") and decreases the speed ratio vRatio of the variator 20.

The synchronization shift is performed at the time of a mode switch shift to suppress a sense of incongruity given to a driver as the input rotation changes due to a difference in the through speed ratio Ratio of the transmission 4. The mode switch shift is performed when the speed ratio vRatio of the variator 20 is the highest speed ratio because a torque input to the sub-transmission mechanism 30 is the smallest in this state under a torque input to the variator 20 at that time and a shift shock of the sub-transmission mechanism 30 can be alleviated if the sub-transmission mechanism 30 is shifted in this state.

Further, according to this shift map, the speed ratio vRatio of the variator 20 becomes the lowest speed ratio and the gear position of the sub-transmission mechanism 30 becomes the first gear position when the vehicle stops.

The controller 12 of this embodiment executes a coast stop control to stop rotation also while the vehicle is running in addition to an idle stop control to stop rotation while the vehicle is in a stopped state to suppress a fuel consumption amount.

In the coast stop control, the engine 1 is automatically stopped to suppress the fuel consumption amount while the vehicle is running in a low vehicle speed region. Note that the coast stop control is common to a fuel-cut control executed when an accelerator pedal is not depressed in that the supply of fuel to the engine 1 is stopped, but differs therefrom in that the lock-up clutch of the torque converter 2 is released to cut power transmission between the engine 1 and the drive wheels 7 and completely stop the rotation of the engine 1.

Upon executing the coast stop control, the controller 12 first judges, for example, conditions (a) to (d) listed below.
(a): accelerator pedal is not depressed at all (accelerator pedal opening APO=0)
(b): brake pedal is depressed (brake switch 47 is ON)
(c): vehicle speed is a predetermined low speed (e.g. 15 km/h) or lower
(d): lock-up clutch is released.

These conditions are, in other words, conditions to judge whether or not a driver has an intension to stop the vehicle.

The controller 12 stops the supply of fuel to the engine 1 to stop the rotation of the engine 1 when a coast stop condition holds.

Figure 4:
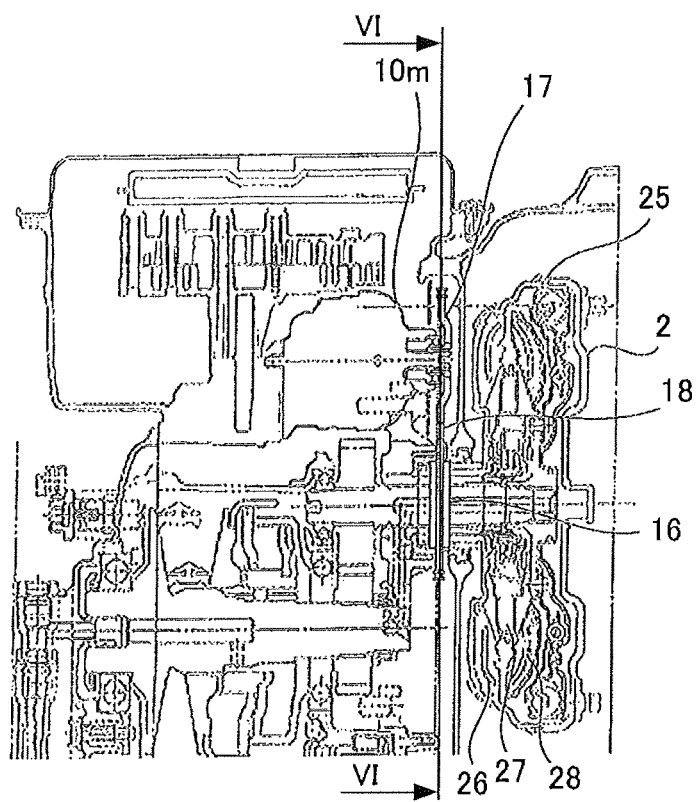
FIG. 4 is a diagram showing the construction of the transmission according to the first embodiment centered on a mechanical oil pump.

FIG. 4 is a diagram showing the construction of the transmission 4 of this embodiment centered on the mechanical oil pump 10m.

Rotation output from the engine 1 rotates a converter housing 25 of the torque converter 2. By this rotation, a pump impeller 26 housed in the converter housing 25 stirs operating oil and rotates a turbine 28 via a stator 27. The turbine 28 is coupled to the first gear train 3, whereby the rotation of the turbine 28 is input to the transmission 4.

The mechanical oil pump 10m is provided near the torque converter 2 and rotated by the rotation of the torque converter 2 to generate a hydraulic pressure.

Sprockets 16, 17 are respectively coupled to the converter housing 25 and the mechanical oil pump 10m, and these sprockets 16, 17 are coupled by a chain 18. The rotation of the converter housing 25 is transmitted to the sprocket 17 via the sprocket 16 and the chain 18.

Since the converter housing 25 is directly coupled to a rotating shaft of the engine 1, the mechanical oil pump 10m constantly rotates while the engine 1 is rotating. Thus, the mechanical oil pump 10m generates a hydraulic pressure necessary for the operation of the transmission 4. This is to constantly generate the hydraulic pressure in a rotating state of the engine 1 since the transmission 4 needs to be controlled by the hydraulic pressure also while the vehicle is in a stopped state.

In this embodiment, the engine 1 is so constructed as to enable an idle stop and a coast stop. When the engine 1 does not rotate, the mechanical oil pump 10m can generate no hydraulic pressure. Accordingly, the electrical oil pump 10e is provided in a hydraulic circuit to generate the hydraulic pressure in idle stop and coast stop states.

The electrical oil pump 10e is driven by the supply of power from the battery 13 under the control of the controller 12 when the supply of the hydraulic pressure to the transmission 4 is necessary while the mechanical oil pump 10m is not operating such as while the rotation of the engine 1 is stopped.

Note that the electrical oil pump 10e operates when a load is relatively low such as at the time of an idle stop or coast stop. Accordingly, the electrical oil pump 10e preferably has a capacity which is sufficient to provide a necessary hydraulic pressure in such a driving condition, but does not lead to a weight increase and a cost increase of the vehicle.

Here, in the case of the coast stop of the engine 1, the engine 1 may temporarily rotate in a reverse direction due to a compression reaction force of a cylinder of the engine as described above.

At this time, since the mechanical oil pump 10m is directly coupled to the rotating shaft of the engine 1, the mechanical oil pump 10m also rotates in a reverse direction when the engine rotates in the reverse direction. When the mechanical oil pump 10m rotates in the reverse direction, the hydraulic pressure generated by the mechanical oil pump 10m becomes negative.

Figure 5:
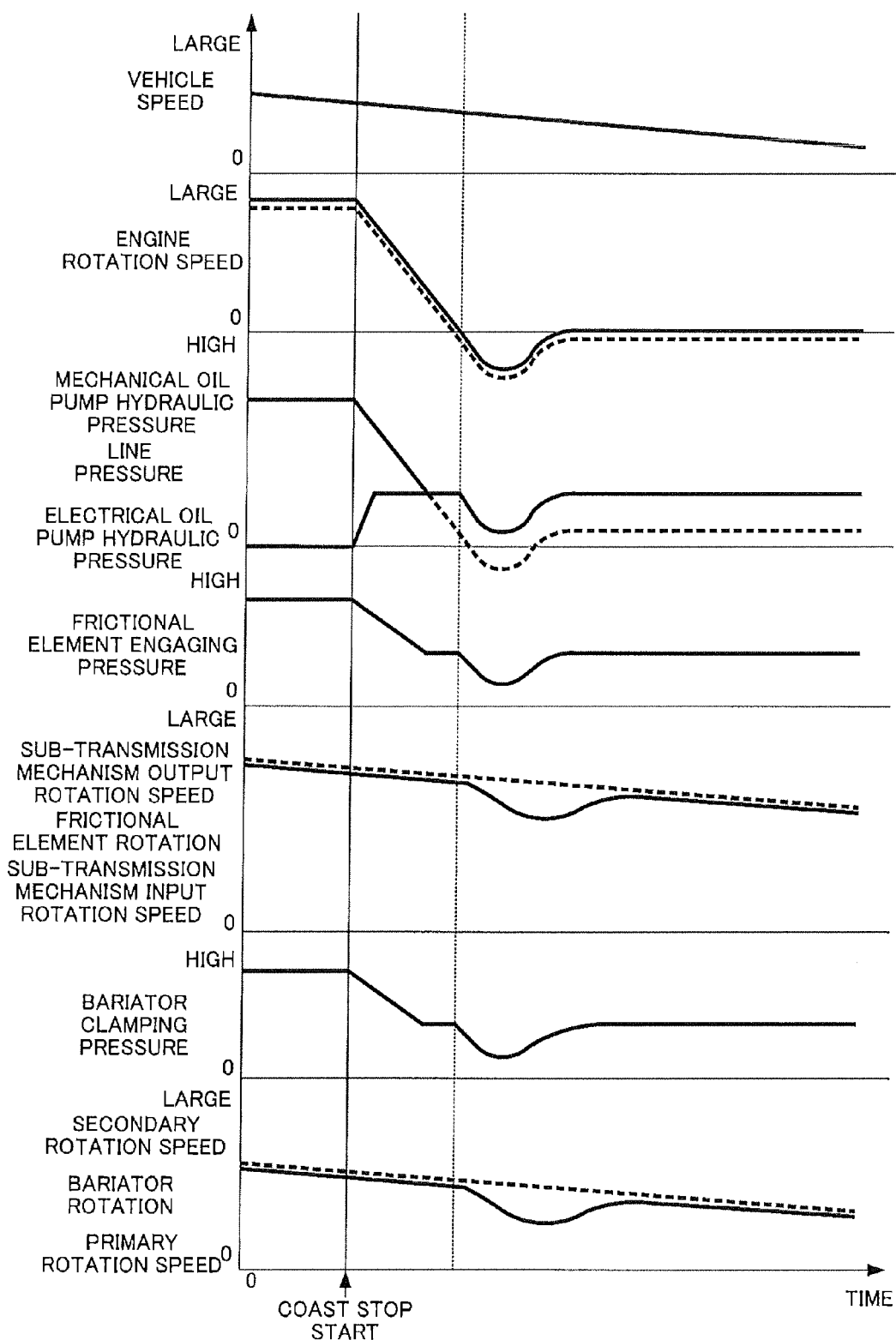
FIG. 5 is a chart of a comparative example showing operations of the transmission at the time of a coast stop in the first embodiment.

FIG. 5 is a chart of a comparative example showing operations of the transmission 4 at the time of a coast stop.

When the driving condition of the vehicle is a coast state and the vehicle speed falls below a predetermined vehicle speed, to the driving condition shifts to a coast stop to release the lock-up clutch of the torque converter 2 and stop the rotation of the engine 1.

By this, the rotation speed of the engine 1 gradually decreases and, eventually, becomes zero. Therefore, the rotation of the mechanical oil pump 10m directly coupled to the rotating shaft of the engine 1 gradually decreases and the hydraulic pressure generated by the mechanical oil pump 10m gradually decreases. Since the hydraulic pressure supplied from the mechanical oil pump 10m to an oil path 39 does not immediately decrease in this case, the line pressure necessary to engage the frictional engagement element of the transmission 4 and tighten the V-belt 23 of the variator 20 can be ensured for a while.

At this time, the controller 12 activates the electrical oil pump 10e to ensure the line pressure when determining that the engine 1 is to be stopped due to the coast stop. Therefore, the line pressure of the hydraulic control circuit 11 is generated by the electrical oil pump 10e instead of the mechanical oil pump 10m. In the transmission 4, an engaging pressure of the frictional engagement element of the sub-transmission mechanism 30 and a clamping pressure of the V-belt 23 of the variator 20 are controlled using the line pressure generated by the electrical oil pump 10e as a source pressure.

By the coast stop, the rotation speed of the engine 1 becomes zero after gradually decreasing. Immediately before stopping, the engine 1 rotates in the reverse direction due to the compression reaction force of the cylinder. Therefore, the mechanical oil pump 10m directly coupled to the rotating shaft of the engine 1 rotates in the reverse direction.

The mechanical oil pump 10m discharges oil from a discharge side to a suction side by this reverse rotation, thereby generating a negative hydraulic pressure at the discharge side.

When an absolute value of the negative hydraulic pressure generated by the mechanical oil pump 10m exceeds that of the hydraulic pressure generated by the electrical oil pump 10e, the line pressure suddenly decreases.

When the line pressure suddenly decreases, the engaging pressure of the frictional engagement element of the sub-transmission mechanism 30 and the clamping pressure of the V-belt 23 of the variator 20 controlled using the line pressure as the source pressure decrease, wherefore necessary engaging and clamping pressures cannot be ensured.

For example, if the engaging pressure of the frictional engagement element of the sub-transmission mechanism 30 falls below a necessary engaging pressure, there is a possibility that this frictional engagement element slips and is damaged such as by being abraded or fractured.

If the V-belt 23 of the variator 20 slips, there is a possibility of not only deviation of the secondary rotation speed from the primary rotation speed, but also abrasion, fracture or like damage of the V-belt 23 or the pulleys 21, 22 caused by the slip of the V-belt 23.

Against such problems, this embodiment is constructed to suppress a reduction of the hydraulic pressure as described below when the engine 1 rotates in the reverse direction due to the coast stop.

Figure 6:
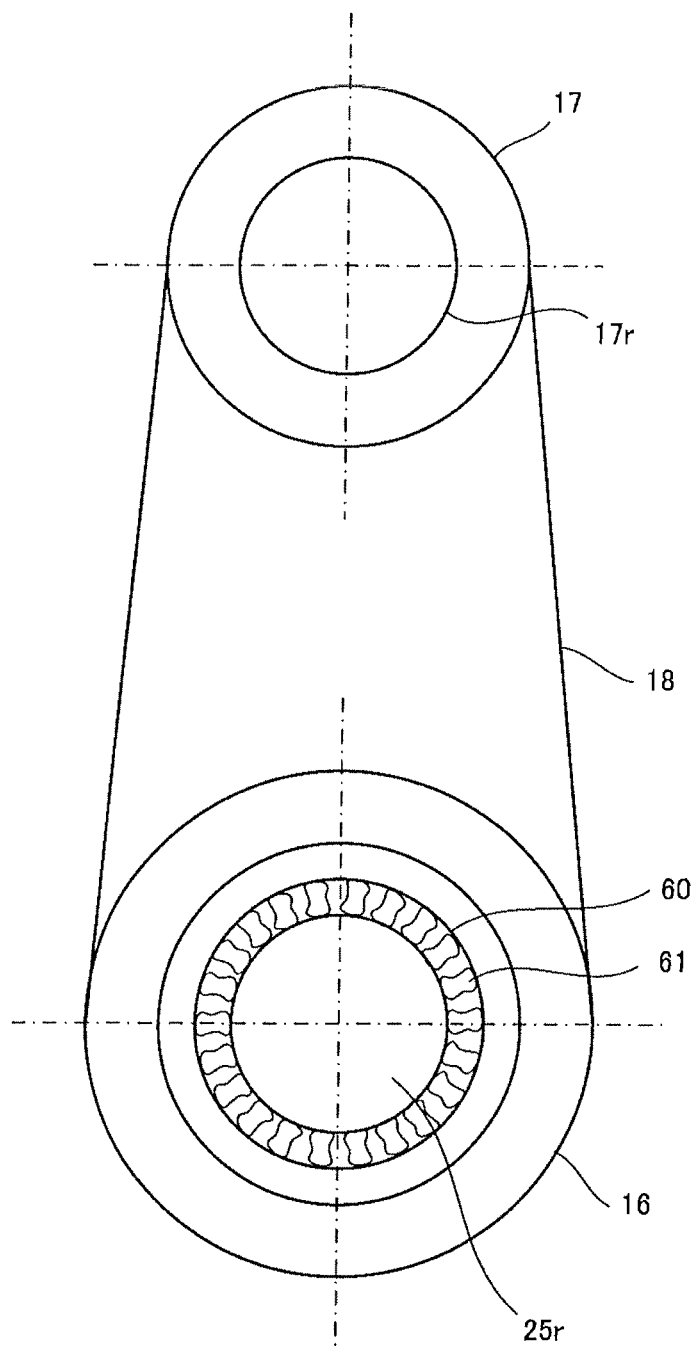
FIG. 6 is a sectional view of the mechanical oil pump according to the first embodiment.

FIG. 6 is a sectional view along VI-VI in FIG. 4 showing the torque converter 2 and a rotating shaft of the mechanical oil pump 10m according to this embodiment.

The mechanical oil pump 10m is so constructed as to be rotated by the sprocket 16 coupled to the converter housing 25 of the torque converter 2 and the chain 18. The sprocket 16 is coupled to a rotating shaft 25r of the converter housing 25 which integrally rotates with the rotating shaft of the engine 1. The sprocket 17 is coupled to a rotating shaft 17r of the mechanical oil pump 10m.

In this embodiment, the sprocket 16 coupled to the rotating shaft 25r of the converter housing 25 includes a one-way clutch 60.

The one-way clutch 60 is interposed between the rotating shaft 25r and the sprocket 16 and includes a plurality of sprags 61 in a circumferential direction to allow rotation of the rotating shaft 25r only in one direction. The one-way clutch 60 transmits the rotation to the sprocket 16 only when the rotating shaft 25r rotates in a forward direction (direction to cause the mechanical oil pump 10m to generate the hydraulic pressure in a hydraulic circuit 39) while not transmitting the rotation to the sprocket 16 when the rotating shaft 25r rotates in a reverse direction (direction to cause the mechanical oil pump 10m to rotate in a reverse direction and generate a negative hydraulic pressure in the hydraulic circuit 39).

Since the one-way clutch 60 does not transmit the reverse rotation to the mechanical oil pump 10m when the engine 1 rotates in the reverse direction, it can be prevented that the hydraulic pressure supplied from the mechanical oil pump 10m becomes negative to reduce the line pressure.

Figure 7:
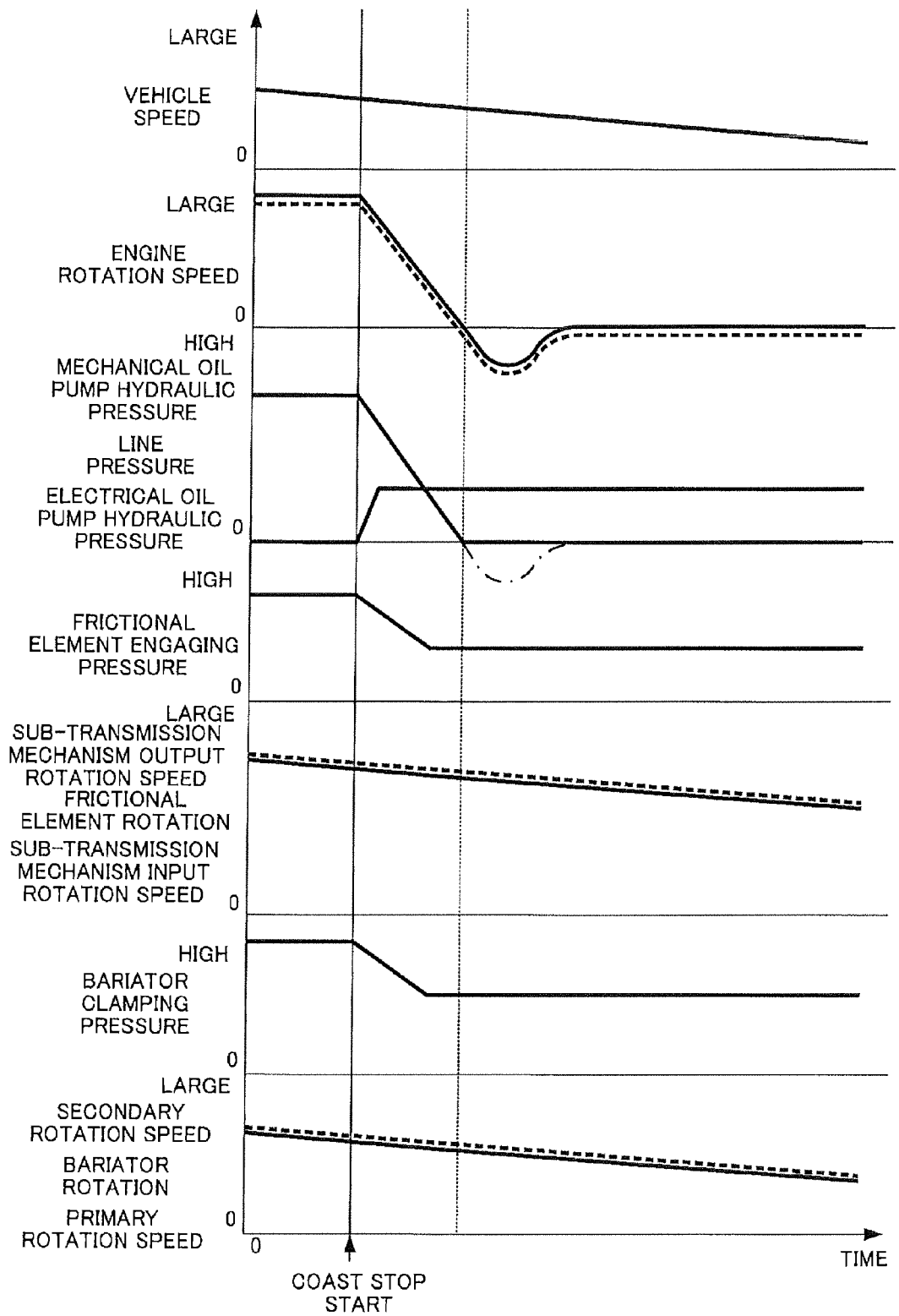
FIG. 7 is a chart showing operations of the transmission at the time of a coast stop according to the first embodiment.

FIG. 7 is a chart showing operations of the transmission 4 at the time of a coast stop in this embodiment.

When the driving condition of the vehicle is a coast state and the vehicle speed falls below a predetermined vehicle speed, the driving condition shifts to a coast stop to release the lock-up clutch of the torque converter 2 and stop the rotation of the engine 1.

By the coast stop, the rotation speed of the engine 1 becomes zero after gradually decreasing. Immediately before stopping, the engine 1 rotates in the reverse direction due to the compression reaction force of the cylinder.

At this time, even if the engine 1 rotates in the reverse direction, the reverse rotation of the engine 1 is not transmitted to the mechanical oil pump 10m by the one-way clutch 60 provided in the sprocket 16.

Accordingly, the mechanical oil pump 10m stops rotating due to inertia and generates no hydraulic pressure. At this time, since the line pressure is ensured by the hydraulic pressure generated by the electrical oil pump 10e, the line pressure does not decrease and the engaging pressure of the frictional engagement element of the sub-transmission mechanism 30 and the clamping pressure of the V-belt 23 of the variator 20 are maintained.

A reduction of the line pressure when the engine 1 rotates in the reverse direction due to the coast stop is prevented by such a structure.

As described above, in the first embodiment of the present invention, the one-way clutch 60 is provided which is switched to transmit the rotation to the mechanical oil pump 10m only when the engine 1 rotates in the forward direction and not to transmit the rotation to the mechanical oil pump 10m when the engine 1 rotates in the reverse direction in order to prevent the hydraulic pressure supplied from the mechanical oil pump 10m from becoming negative and the line pressure from decreasing due to the reverse rotation of the mechanical oil pump 10m caused by the reverse rotation of the engine 1.

By this, a reduction of the line pressure can be prevented since the reverse rotation is not transmitted to the mechanical oil pump 10m when the engine 1 rotates in the reverse direction. This can not only prevent the frictional engagement element of the transmission 4 and the V-belt 23 of the variator 20 from slipping due to a reduction of the engaging pressure of the frictional engagement element and the clamping pressure of the V-belt 23 and a sense of incongruity from being given to a driver such as by an engine runup, but also prevent abrasion and damage of the frictional engagement elements and the variator 20.

Second Embodiment

Next, a second embodiment of the present invention is described. The second embodiment differs in the construction of a mechanical oil pump 10m. Note that a basic construction (FIGS. 1 to 3) of the second embodiment is the same as that of the first embodiment and not described.

Figure 8:
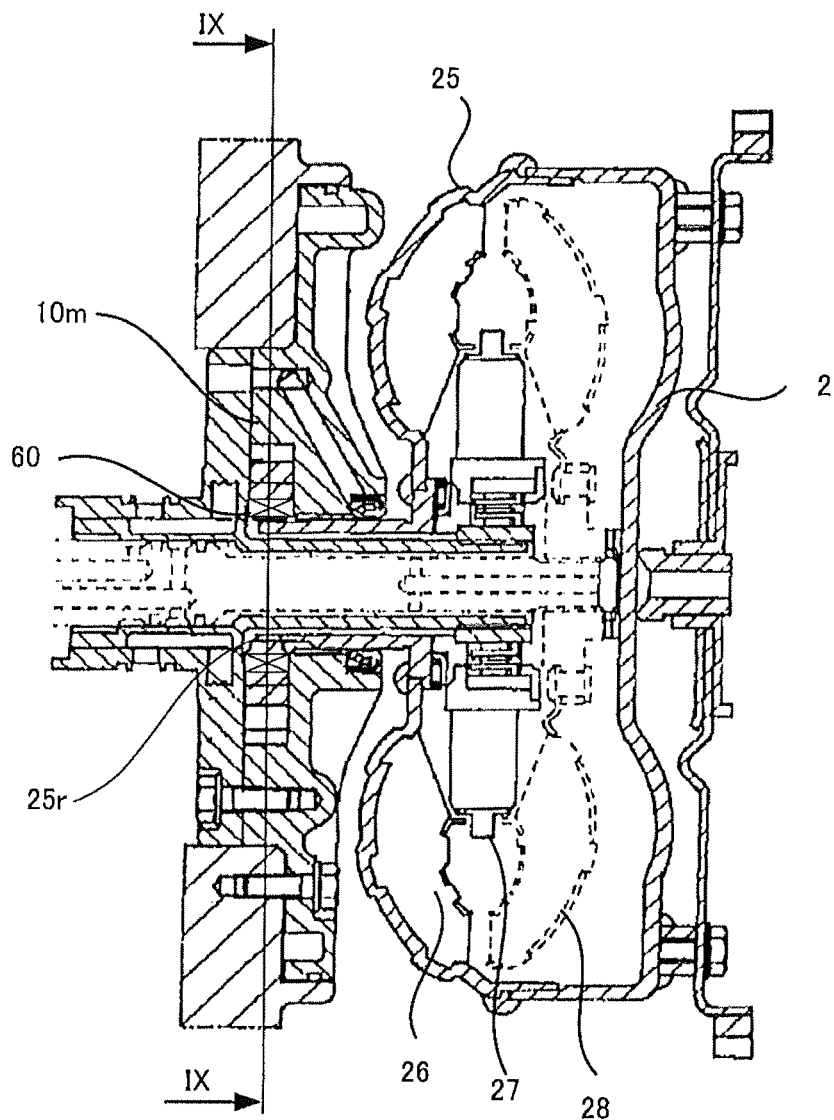
FIG. 8 is a diagram of a second embodiment centered on a mechanical oil pump.
Figure 9:
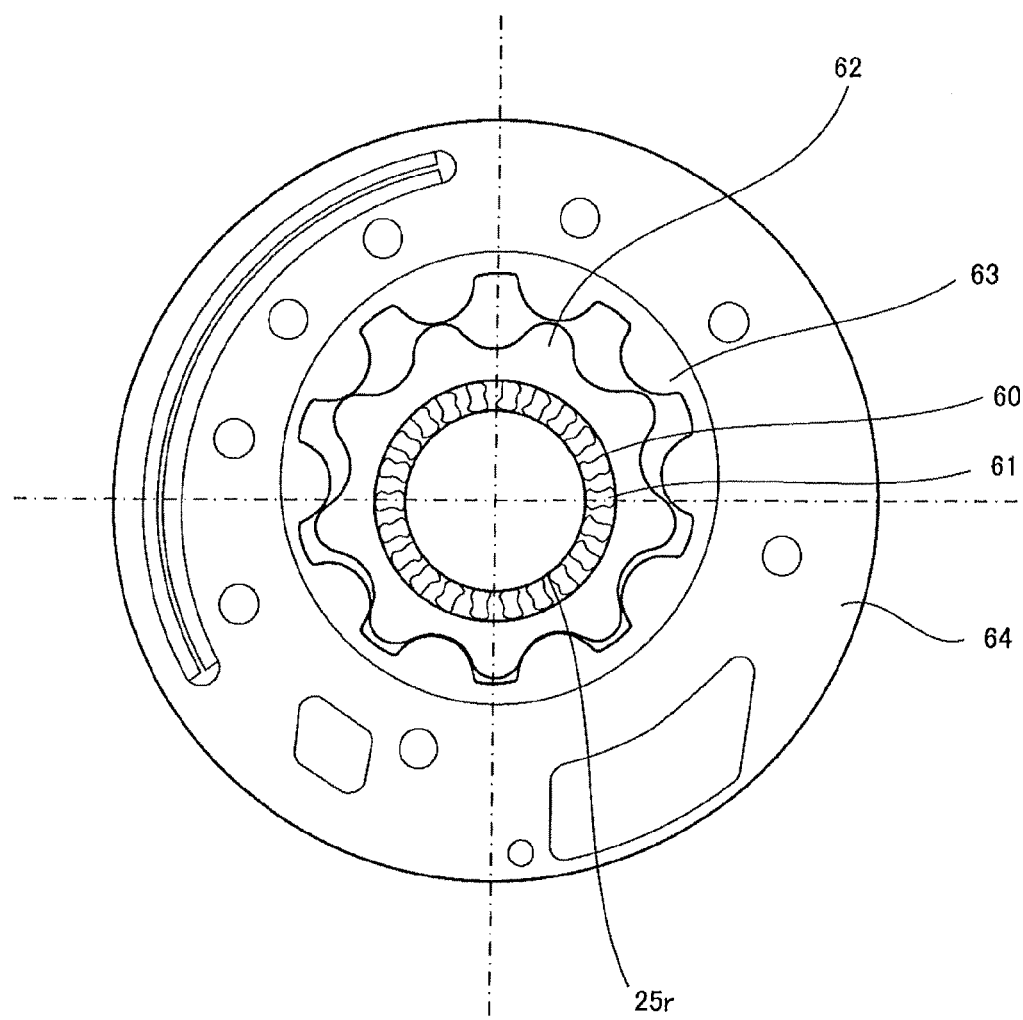
FIG. 9 is a sectional view of the mechanical oil pump according to the second embodiment.

FIG. 8 is a diagram showing the second embodiment centered on the mechanical oil pump 10m and FIG. 9 is a sectional view of the mechanical oil pump 10m along IX-IX in FIG. 8.

Rotation output from the engine 1 rotates a converter housing 25 of a torque converter 2. By this rotation, a pump impeller 26 housed in the converter housing 25 stirs operating oil and rotates a turbine 28 via a stator 27. The turbine 28 is coupled to a first gear train 3, whereby the rotation of the turbine 28 is input to the transmission 4.

The mechanical oil pump 10m is provided on the outer periphery of a rotating shaft 25r coupled to the converter housing 25 of the torque converter 2 and rotated by the rotation of the torque converter 2 to generate a hydraulic pressure.

As shown in FIG. 9, the mechanical oil pump 10m is an internal gear pump which generates a hydraulic pressure by carrying operating oil by an inner gear 62 coupled to the rotating shaft 25r and an outer gear 63 which rotates while being engaged with the inner gear 62.

Further, a one-way clutch 60 is interposed between the rotating shaft 25r and the inner gear 62. The one-way clutch 60 includes a plurality of sprags 61 in a circumferential direction and allows rotation only in one direction similar to the first embodiment.

The one-way clutch 60 is so constructed as to transmit the rotation to the inner gear 62 only when the rotating shaft 25r rotates in a forward direction (direction to cause the mechanical oil pump 10m to generate a hydraulic pressure in a hydraulic circuit 39) and not to transmit the rotation to the inner gear 62 when the rotating shaft 25r rotates in a reverse direction (direction to cause the mechanical oil pump 10m to rotate in a reverse direction and generate a negative hydraulic pressure in the hydraulic circuit 39).

By such a construction, the reverse rotation is not transmitted to the mechanical oil pump 10m when the engine rotates in the reverse direction. Thus, it can be prevented that the hydraulic pressure supplied from the mechanical oil pump 10m becomes negative to reduce the line pressure.

As described above, in the second embodiment in which the mechanical oil pump 10m is provided on the outer periphery of the drive shaft of the engine 1, effects similar to those of the first embodiment can be obtained.

Specifically, a reduction of the line pressure can be prevented since the reverse rotation is not transmitted to the mechanical oil pump 10m when the engine 1 rotates in the reverse direction. This can not only prevent the frictional engagement element of the transmission 4 and the V-belt 23 of the variator 20 from slipping due to a reduction of the engaging pressure of the frictional engagement element and the clamping pressure of the V-belt 23 and a sense of incongruity from being given to a driver such as by an engine runup, but also prevent abrasion and damage of the frictional engagement elements and the variator 20.

The embodiments of the present invention have been described above. The above embodiments are merely illustrations of application examples of the present invention and not of the nature to limit the technical scope of the present invention to the specific constructions of the above embodiments.

Although the electrical oil pump 10e is provided to ensure the line pressure at the time of a coast stop in the above embodiments, the electrical oil pump 10e may not always be provided. Even if the electrical oil pump 10e is not provided, the hydraulic pressure supplied from the mechanical oil pump 10m does not immediately decrease even when the operation of the mechanical oil pump 10m stops and the supply of the hydraulic pressure to the frictional engagement elements and the pulleys stops due to the coast stop. Thus, the line pressure for the engaging force of the frictional engagement element and the belt clamping force can be ensured for a predetermined time after the start of the stopped state of the engine 1. Therefore, the engine can be stopped for the predetermined time before the vehicle speed becomes zero and fuel economy can be improved.

In the construction including the electrical oil pump 10e, the line pressure for the engaging force of the frictional engagement element and the belt clamping force can be ensured by generating the hydraulic pressure even after the mechanical oil pump 10m stops. Thus, the time during which the engine 1 can be stopped due to the coast stop can be further extended, and fuel economy can be further improved as compared with the construction not including the electrical oil pump 10e.

Although the one-way clutch 60 is provided between the rotating shaft 25r of the converter housing 25 and the sprocket 16 in the first embodiment, it may be provided between the rotating shaft 17r of the mechanical oil pump 10m and the sprocket 17.

Although the transmission 4 whose speed ratio is controlled by the hydraulic pressure generated by the mechanical oil pump 10m is illustrated in the above embodiments, the present invention can be applied for the purpose of preventing a reduction of a hydraulic pressure generated by a mechanical oil pump 10m in a hydraulic control device in which the mechanical oil pump 10m is driven by a driving force source and may possibly rotate in a reverse direction when the driving force source stops.

Although the belt-type continuously variable transmission mechanism is provided as the variator 20 in the above embodiments, the variator 20 may be a continuously variable transmission mechanism in which a chain belt is mounted between the pulleys 21 and 22 instead of the V-belt 23. Alternatively, the variator 20 may be a toroidal-type continuously variable transmission mechanism in which an inclinable power roller is arranged between an input disk and an output disk.

Although the sub-transmission mechanism 30 is a transmission mechanism with two forward gear positions, i.e. the first and second gear positions in the above embodiments, it may be a transmission mechanism with three or more forward gear positions. Further, although the transmission includes the sub-transmission mechanism 30 and the variator 20 in the above embodiments, it may include only a stepped transmission mechanism or only a variator.

Although the sub-transmission mechanism 30 is constructed using the Ravigneaux-type planetary gear mechanism, it is not limited to such a construction. For example, the sub-transmission mechanism 30 may be constructed by combining a normal planetary gear mechanism and frictional engagement elements or may be constructed by a plurality of power transmission paths including a plurality of gear trains with different gear ratios and frictional engagement elements for switching these power transmission paths.

Although the hydraulic cylinders 23a, 23b are provided as actuators for displacing the movable conical plates of the pulleys 21, 22 in the axial directions, the actuators are not limited to hydraulically driven ones and may be electrically driven.

This application claims priority from Japanese Patent Application No. 2010-203468, filed Sep. 10, 2010, which is incorporated herein by reference in its entirety.

What is claimed is:

1. A oil hydraulic control device, comprising:
an oil pump configured to generate a hydraulic pressure by being rotated only by power of an engine of a vehicle;
a driving force source stopping unit that stops rotation of the engine when the vehicle is running and a predetermined condition holds; and
a cut-off unit that cuts off transmission of the power from the engine to the oil pump when the engine rotates in a reverse direction as the rotation of the engine is stopped by the driving force source stopping unit.

2. The hydraulic control device according to claim 1, wherein the cut-off unit is a one-way clutch which drives the oil pump only in one direction.

3. The hydraulic control device according to claim 2, wherein the one-way clutch is provided between a rotating shaft of the engine and a sprocket coupled to the rotating shaft of the engine and adapted to transmit the rotation to the oil pump via a chain.

4. The hydraulic control device according to claim 2, wherein the one-way clutch is provided between a pump rotating shaft of the oil pump and a sprocket which is coupled to the pump rotating shaft and to which the rotation of the engine is transmitted via a chain.

5. The hydraulic control device according to claim 2, wherein:
the oil pump is driven by a pump rotating shaft coupled to a rotating shaft of the engine and coaxially provided with the rotating shaft; and
the one-way clutch is provided between the rotating shaft of the engine and the pump rotating shaft.

6. An automatic transmission including the hydraulic control device according to claim 1, wherein the oil pump generates the hydraulic pressure by being rotated only by power of the engine.

7. A control method for controlling a hydraulic control device which comprises an oil pump configured to generate a hydraulic pressure by being rotated only by power of an engine of a vehicle, and a driving force source stopping unit that stops rotation of the engine when the vehicle is running and a predetermined condition holds, comprising:
cutting off transmission of the power from the engine to the oil pump when the engine rotates in a reverse direction as the rotation of the engine is stopped by the driving force source stopping unit.

8. A hydraulic control device, comprising:
an oil pump configured to generate a hydraulic pressure by being rotated only by power of an engine of a vehicle;
driving force source stopping means for stopping rotation of the engine when the vehicle is running and a predetermined condition holds; and
cut-off means for cutting off transmission of the power from the engine to the oil pump when the engine rotates in a reverse direction as the rotation of the engine is stopped by the driving force source stopping means.

9. The hydraulic control device according to claim 8, wherein the cut-off means is a one-way clutch which drives the oil pump only in one direction.

10. The hydraulic control device according to claim 9, wherein the one-way clutch is provided between a rotating shaft of the engine and a sprocket coupled to the rotating shaft of the engine and adapted to transmit the rotation to the oil pump via a chain.

11. The hydraulic control device according to claim 9, wherein the one-way clutch is provided between a pump rotating shaft of the oil pump and a sprocket which is coupled to the pump rotating shaft and to which the rotation of the engine is transmitted via a chain.

12. The hydraulic control device according to claim 9, wherein:
   the oil pump is driven by a pump rotating shaft coupled to a rotating shaft of the engine and coaxially provided with the rotating shaft; and
   the one-way clutch is provided between the rotating shaft of the engine and the pump rotating shaft.

13. An automatic transmission including the hydraulic control device according to claim 8, wherein the oil pump generates the hydraulic pressure by being rotated only by power of the engine.

\* \* \* \* \*